Dec. 26, 1967  L. MINA  3,359,612
MILLING HEAD WITH REVERSIBLE TIP CUTTERS
Filed May 10, 1967  2 Sheets-Sheet 1
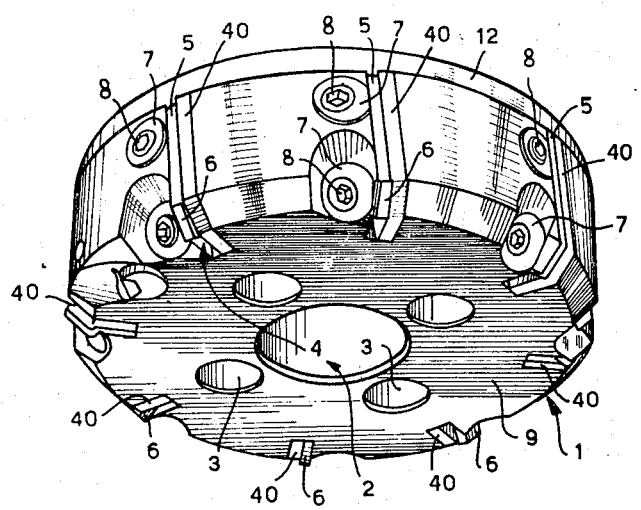
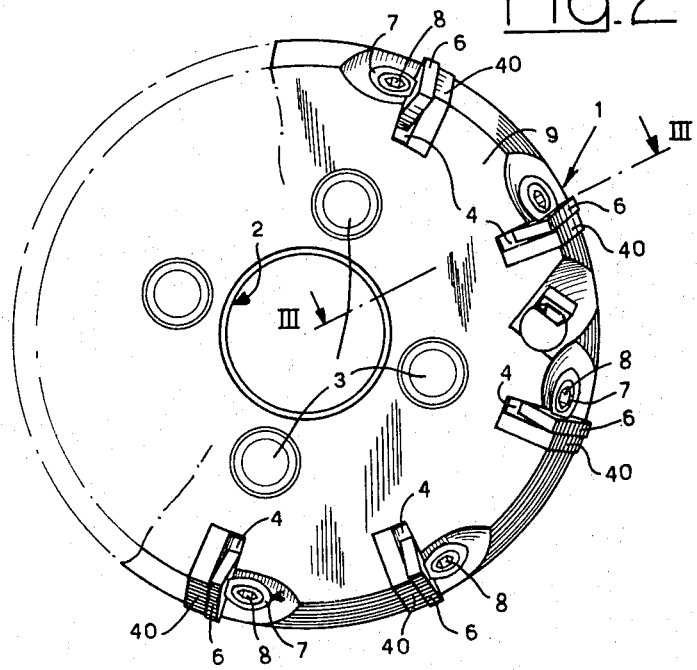

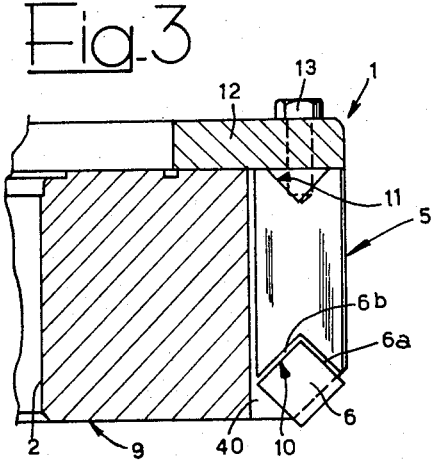
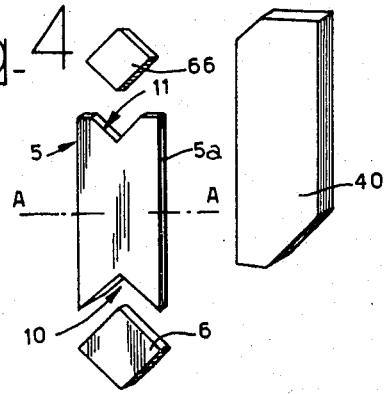
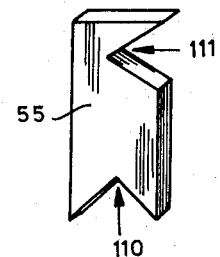
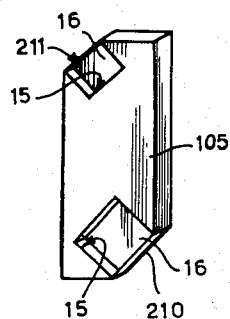
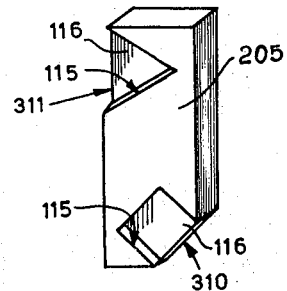

United States Patent Office 3,359,612
Patented Dec. 26, 1967

3,359,612
MILLING HEAD WITH REVERSIBLE
TIP CUTTERS
Livio Mina, Fino Mornasco, Italy, assignor to U.S.A.P. Utensileria Speciale Alta Precisione, Fino Mornasco, Italy
Filed May 10, 1967, Ser. No. 637,520
Claims priority, application Italy, May 14, 1966, 11,599/66
3 Claims. (Cl. 29—105)

ABSTRACT OF THE DISCLOSURE

Each of the stop blocks for the tips is reversible in its accommodating slot and is formed with a pair of seats contoured to respectively accommodate tips pertaining to different series. Additionally, the seating of the stop blocks in either position in their slots is automatically established by a fixed abutment surface closing the rear ends of the slots.

---

This invention relates to milling heads with reversible tips or teeth.

Milling heads of this character are disclosed, e.g., by "TZ für Praktische Metallbearbeitung" 59 (1965), pages 384–389, and comprise a circular body formed with a circumferential series of (at least substantially) axially or radially directed slots, each of which accommodates a reversible tip and an exchangeable stop block for the latter, clamp means being associated with each of the slots for locking the tips and stop blocks (of course, after the required setting of the latter has been accomplished); said clamp means usually comprise a pair of wedge members and tightening bolts for the latter manually operable by means of a suitable wrench.

The tips consist of hard-metal plates, typically of a polygonal (mostly, square-shaped) form, and a series of mutually identical tips is fitted into the head to perform a given work. To that end, each of the stop blocks is formed with a seat for its respective tip matching the contour of the latter. Moreover, a backing plate is usually associated (or integrally formed) with the stop block, to provide a support for one of the two opposed flat faces of the tip, the other of said flat faces being acted upon by a wedge member of the above-mentioned clamp means, the other wedge member being effective to clamp the stop block.

In the prior art reversible-tip milling heads, each specific series of tips of necessitates its corresponding series of stop blocks, at least as the tips in one series differ either in shape and/or dimensions from the tips of the other series, essentially because, in order to perform a correct machining, each tip must be both well matched by its seat and backed on a sufficient area by its backing plate or surface. Thus, a given milling head necessitates in pactice as many series of stop blocks as there are the specific series of tips usable on the head.

Another drawback of the prior art reversible-tip milling heads resides in that suitable measuring instruments (gauges) and time-consuming operation are necessary for a correct setting of the stop blocks in their slots in the head each time the just used series of stop blocks is to be replaced by another series.

In view of the above, a primary object of this invention is to provide an improved reversible-tip milling head, permitting a substantial cut-down in the numeric quantity of series of stop blocks necessary for a full exploitation of the head. A further object of the invention is to automatically achieve a correct positioning of the stop blocks in their slots in a quick, gauge-less manner. Still further objects and advantages of this invention will become evident to those skilled in the art from the foregoing description.

In view of the foregoing objects, this invention provides an improved, reversible-tip milling head comprising a circular body formed with a circumferential series of slots, an exchangeable elongated stop block in each of the slots formed at one end with a seat matching a relevant part of the contour of a reversible tip for said head, and clamp means associated with each of said slots for clamping in the latter their respective stop blocks and tips in operative position, said head being characterized in that each of said stop blocks is reversible in its slot and is formed at its opposed end with a further seat, differing from the first-mentioned seat (e.g. as to dimensions, geometrical shape and/or orientation), thereby to operatively accommodate in its reversed position in the slot a tip correspondingly differing from said first-mentioned tip.

According to a further embodiment of the invention, the rear ends of the slots are closed by a fixed abutment surface for the stop blocks, the length of the stop blocks and the mutual spacing of the two seats in each of them being so correlated with the length of the slots, that, in either of the two positions of a block in its slot, one of the seats in the block takes its working position as its opposed end of the block contacts said abutment surface.

According to a still further embodiment, said abutment surface is provided by an annular member, bolted to the body of the head co-axially with the latter.

This invention is moreover intended to provide and cover, for use in a reversible-tip milling head as defined hereinbefore, an exchangeable stop block of elongated shape, characterized in that, considering the slots in the head, the block is reversible in any one of the slots and is formed at its opposite end with a further seat, differing from the seat first-mentioned above, thereby to operatively accommodate in its reversed position in the slot a tip correspondingly differing from the first-mentioned tip.

In the accompanying drawings:

FIGURE 1 is a perspective view showing a milling head improved according to the invention;

FIGURE 2 is a front end view of the head of FIGURE 1;

FIGURE 3 is a cross-sectional part-view on line III—III of FIGURE 2;

FIGURE 4 is a perspective view of one of stop blocks employed in the milling head according to FIGURES 1 to 3;

FIGURE 5 shows a modification of FIGURE 4;

FIGURE 6 shows a further embodiment of the stop block;

FIGURE 7 shows a modification of FIGURE 6.

Referring to FIGURES 1 to 4, reference 1 generally denotes the milling head comprising a circular metal body formed with a central axial aperture 2 for the spindle of the milling machine (not shown) and with holes 3 for screws holding the milling head on the spindle.

The head 1 is moreover formed with a circumferential series of longtiudinally directed, open-ended slots 4 each of which accommodates a stop block 5 with its associated polygonal tip 6 and a backing plate 40, the stop blocks 5 being identical with each other and carrying mutually identical tips 6 for a given work to be performed.

Each slot 4 has associated therewith clamp means of known type, comprising a pair of wedges 7, 7' operated by screw-threaded bolts 8, 8' for clamping the elements 5, 6 and 40 in operative position in which a cutting edge of each tip 6 properly protrudes from the body of the head, e.g. with reference to the front face 9 of the latter.

Each of the stop blocks 5 comprises an elongated metal plate 5a (FIG. 4) formed at its opposite ends with two seats 10, 11, respectively, mutually differing for receiving correspondingly differing tips denoted by 6 and 66 in FIGURE 4.

The stop blocks 5 are fitted into the slots 4 with their selected seat (in the embodiment shown in FIGURE 3, the seat 10) turned in the direction of the front face 9 of the head for accommodating the corresponding tip (in the example shown, the tip 6) arranged in the abovementioned operative position.

In order to employ the series of tips 66 instead of the series of tips 6, the stop blocks 5 are turned upside down, e.g. by rotation about the axis A—A indicated in FIGURE 4 in order to bring the opposite seat 11 to its operative position, and are clamped in this position in the slots 4 together with the backing plates 40 and tips 66.

For correct axial positioning of the stop blocks 5 in the slots the head 1 is provided with an annular disc 12 secured by means of screws 13 to the face of the head opposite its front face 9.

The disc 12 closes the slots 4 at their rear ends and acts as an axial backing surface for the stop blocks 5. The axial length of the stop blocks and the mutual spacing of the two seats formed therein are so correlated with the length of the slot, that, as the stop block abuts by either of its ends the disc 12 (see FIG. 3), the seat formed in its other end automatically takes its operative position, in which its associated tip protrudes from the head body in the proper direction and by the proper extent.

In the stop block shown in FIGURE 4 the seats 10 and 11 are in the form of notches of a 90° V-shape formed at the opposite ends of the plate 5a and differing in dimensions in order to accommodate the two square tips 6 and 66 of correspondingly different dimensions belonging to two different (generally "standard") series of tips.

As is visible in FIGURE 3, the square tip 6 mounted in the seat 10 matches by two (6a, 6b), of its four sides the sides of the seat 10 and bears by one of its planar faces on the corresponding face of the backing plate 40 against which the tip is clamped by the wedge 7 of its associated clamp means (FIG. 1), while the wedge 7' clamps the stop block.

In the modification shown in FIGURE 5 the stop block 55 is formed with two seats 110, 111 in the form of V-notches differing in apex angle and differently oriented. The seat 110 accommodates a square tip similarly to the seat 10 in FIGURE 4, whereas the seat 111 is designed to accommodate a triangular tip (not shown).

In the modification shown in FIGURE 6 the stop block 105 is formed with two seats 210 and 211 which, instead of being of V-notch form, are formed by shallow recesses impressed in one of the planar faces of the stop block. Each seat has a circumferential contour 15 formed by three sides sequentially perpendicular to one another and a bottom wall 16 acting as a backing surface for a tip. A separate backing plate becomes thus superfluous. The seats 210 and 211 are designed in the embodiment shown to accommodate square tips differing in dimensions.

In FIGURE 7 the stop block 205 has impressed therein two seats 310 and 311 adapted to receive a square and a triangular tip, respectively. Each seat has similarly to the preceding example a contour 115 matching at least two sides of the polygonal tip to bear thereon and a bottom wall 116 for backing one of the planar faces of the tip.

What I claim is:

1. In a reversible-tip milling head comprising a circular body formed with a circumferential series of slots, an elongated stop block in each of the slots formed at one end with a seat matching a relevant part of the contour of a reversible tip for said head, and clamp means associated with each of said slots for clamping in the latter their respective stop blocks and tips, the improvement comprising each of said stop blocks being reversible with respect to its slot and having formed at its opposed end a further seat differing from the first mentioned seat thereby to operatively accommodate in its reversed position in the slot a tip correspondingly differing from the first mentioned tip.

2. The milling head of claim 1, moreover comprising a fixed abutment surface closing the rear ends of the slots providing an end-wise effective abutment for each of the stop blocks in the slots, the length of the stop blocks and the mutual spacing of the two seats in each of them being correlated with the length of the slots, whereby in either of the two positions of a block in its slot one of the seats in the block takes its working position as its opposed end of the block contacts said abutment surface.

3. The milling head of claim 2, wherein said fixed abutment surface closing the rear ends of the slots is provided by an annular member bolted to the body of the head co-axially with the latter.

No references cited.

HARRISON L. HINSON, *Primary Examiner.*